United States Patent
Liu et al.

(10) Patent No.: US 11,341,712 B2
(45) Date of Patent: May 24, 2022

(54) VR VIDEO PROCESSING METHOD AND RELATED APPARATUS

(71) Applicant: Huawei Technologies Co., Ltd., Shenzhen (CN)

(72) Inventors: Hongbo Liu, Nanjing (CN); Liang Wu, Nanjing (CN); Wei He, Shenzhen (CN); Li Jin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/245,905

(22) Filed: Apr. 30, 2021

(65) Prior Publication Data

US 2021/0248810 A1    Aug. 12, 2021

Related U.S. Application Data

(63) Continuation of application No. PCT/CN2019/112410, filed on Oct. 22, 2019.

(30) Foreign Application Priority Data

Nov. 8, 2018 (CN) .......................... 201811327393.1

(51) Int. Cl.
G06T 15/20 (2011.01)

(52) U.S. Cl.
CPC .......... *G06T 15/20* (2013.01); *G06T 2200/04* (2013.01)

(58) Field of Classification Search
None
See application file for complete search history.

(56) References Cited

U.S. PATENT DOCUMENTS

| | | | |
|---|---|---|---|
| 11,070,891 B1* | 7/2021 | Ettinger | H04N 21/4307 |
| 2006/0126093 A1* | 6/2006 | Fedorovskaya | G06T 7/44 |
| | | | 358/1.14 |
| 2012/0288139 A1* | 11/2012 | Singhar | G06F 1/3265 |
| | | | 382/103 |
| 2012/0326969 A1* | 12/2012 | Ramanathan | G06F 3/013 |
| | | | 345/156 |
| 2017/0064296 A1 | 3/2017 | Rogozinski et al. | |
| 2017/0316806 A1 | 11/2017 | Warren et al. | |
| 2017/0347084 A1 | 11/2017 | Boyce | |
| 2018/0192058 A1* | 7/2018 | Chen | G06T 7/11 |
| 2018/0278995 A1 | 9/2018 | Takahashi | |
| 2018/0332317 A1* | 11/2018 | Song | G06F 16/70 |
| 2019/0102944 A1* | 4/2019 | Han | G06T 15/20 |
| 2019/0253743 A1* | 8/2019 | Tanaka | H04N 21/812 |
| 2019/0289055 A1 | 9/2019 | Huang et al. | |
| 2019/0335287 A1* | 10/2019 | Jung | H04N 7/157 |

(Continued)

FOREIGN PATENT DOCUMENTS

| | | |
|---|---|---|
| CN | 106101847 A | 11/2016 |
| CN | 106484122 A | 3/2017 |

(Continued)

*Primary Examiner* — Frank S Chen
(74) *Attorney, Agent, or Firm* — Conley Rose, P.C.

(57) ABSTRACT

A virtual reality (VR) video processing apparatus and a VR method divides a received video image into a plurality of regions, establishes a region popularity table of the video image and updates the region popularity table by tracking an angle of view of a user when a video is playing, to collect information about a hotspot region in a panoramic video, and sends a hotspot region prompt to the user.

20 Claims, 5 Drawing Sheets

(56) References Cited

U.S. PATENT DOCUMENTS

2020/0021795 A1   1/2020  Zhou
2020/0285857 A1*  9/2020  Vaquero ............. G06K 9/00604

FOREIGN PATENT DOCUMENTS

| CN | 107135237 A | 9/2017 |
| CN | 107395984 A | 11/2017 |
| CN | 108632674 A | 10/2018 |
| EP | 3112985 A1 | 1/2017 |

* cited by examiner

VR VIDEO PROCESSING METHOD AND RELATED APPARATUS

CROSS-REFERENCE TO RELATED APPLICATIONS

This application is a continuation of International Patent Application No. PCT/CN2019/112410 filed on Oct. 22, 2019, which claims priority to Chinese Patent Application No. 201811327393.1 filed on Nov. 8, 2018. The disclosures of the aforementioned applications are hereby incorporated by reference in their entireties.

TECHNICAL FIELD

This application relates to the field of virtual reality technologies, and in particular, to a virtual reality (VR) video processing method and a related apparatus.

BACKGROUND

A VR technology is a computer simulation system in which a virtual world can be created and experienced. In the virtual reality technology, a computer is used to generate a simulated environment. The virtual reality technology is used for simulation of an interactive system featuring multi-source information fusion, three-dimensional dynamic visions, and entity behavior, so that a user can be immersed in the environment. Herein, a VR panoramic video (e.g., 360-degree VR video) is a typical application scenario of the VR technology.

Each frame of the VR panoramic video includes all information on a three-dimensional spherical surface centered on a video shooting location, which is different from a conventional video. Therefore, when viewing the VR panoramic video, a user can selectively view a scenario in a region on the spherical surface by switching an angle of view. However, the conventional video includes only partial information of the spherical surface. Therefore, the user can view only information in a scenario provided by the video.

In a process of viewing the VR panoramic video, the user may switch the angle of view and select to view a scenario in which the user is interested. However, the user actually views only a part of an image of a video frame, and does not have an overall understanding of a panoramic image. As a result, the image viewed by the user is actually not a highlight image in the panoramic video. Consequently, the user may miss video content in which the user may be more interested.

SUMMARY

Embodiments of the present disclosure provide a VR video processing method and a related apparatus, to resolve a problem in other approaches that a user may miss highlight video content due to random switching of an angle of view.

According to a first aspect, an embodiment of the present disclosure provides a VR video processing method. The method may include a video processing device receives location information that is of an angle of view of a user in a first video image and that is sent by a terminal device. The first video image is a video image of a video currently viewed by the user. Then, the video processing device determines a region of the angle of view of the user in the first video image based on the received location information. Herein, the region is one of N regions obtained by dividing the first video image, and N is a positive integer. The video processing device updates a region popularity table of the first video image based on the region. The region popularity table includes popularity information of the N regions. The video processing device generates, based on the popularity information of the region popularity table of the first video image or popularity information of a region popularity table of a second video image, a hotspot region prompt corresponding to the second video image. The second video image is a next frame of to-be-displayed video image of the first video image.

In the foregoing method, a location of the angle of view of the user in the video image can be tracked, and the region popularity table of the video image can be maintained and updated. Hotspot region information can be obtained based on the popularity information of the region popularity table, and the hotspot region prompt can be provided for the user. In this way, the angle of view of the user can be effectively guided to move, and the user will not miss highlight content in the panoramic video. Therefore, user experience is improved.

In a possible solution, a size of the region obtained through division is the same as a size of a field of view of the terminal device.

In a possible solution, the popularity information includes a popularity value. A specific update method of updating the region popularity table of the first video image based on the region includes increasing a popularity value of the region in the region popularity table of the first video image by 1.

In the foregoing method, the region popularity table may be updated based on the region of the angle of view of the user, so that the region popularity table can reflect the region in which the user is interested. It is ensured that the hotspot region prompt can be used to effectively guide the user to move the angle of view.

In a possible solution, that the video processing device generates the hotspot region prompt of the second video image specifically includes the video processing device first determines a hotspot region of the second video image. The determining is performed based on the following the hotspot region is a region with a highest popularity value in the region popularity table of the first video image, or the hotspot region is a region with a highest popularity value in the region popularity table of the second video image. There may be one or a plurality of regions with the highest popularity value. In addition, the hotspot region prompt corresponding to the hotspot region is added to the first video image.

In the foregoing method, information of a hotspot region with high viewing popularity may be obtained based on the region popularity table, and the high viewing popularity means that the user is relatively interested in the hotspot region. The hotspot region prompt is provided for the user, to effectively guide the user to move the angle of view and the user will not miss content in which the user may be interested. Therefore, user experience is improved.

According to a second aspect, an embodiment of the present disclosure provides a video processing device for VR video processing. For beneficial effects, refer to descriptions in the first aspect. Details are not described herein again. The device has functions for implementing behavior in the method embodiment in the foregoing first aspect. The functions may be implemented by using hardware, or may be implemented by hardware by executing corresponding software. The hardware or software includes one or more modules corresponding to the foregoing functions. In a possible design, a structure of the video processing device includes a division module, an establishing module, a tracking module, an update module, and a prompt module. These modules may implement the corresponding functions in the foregoing example of the method in the first aspect. For details, refer to detailed descriptions in the example of the method. Details are not described herein again.

According to a third aspect, an embodiment of the present disclosure further provides a video processing device for VR video processing. For beneficial effects, refer to descriptions in the first aspect. Details are not described herein again. A structure of the device includes a processor, and may further include a transceiver or a memory. The processor is configured to support the corresponding functions in the method in the foregoing first aspect performed by the video processing device. The memory is coupled to the processor, and the memory stores a program instruction and data required by the device. The transceiver is configured to communicate with another device.

According to a fourth aspect, this application further provides a computer readable storage medium. The computer readable storage medium stores an instruction. When the instruction is run on a computer, the computer is enabled to perform the method in the foregoing aspect.

These or other aspects of the present disclosure are clearer and more comprehensible in descriptions of the following embodiments.

DESCRIPTION OF EMBODIMENTS

Embodiments of the present disclosure provide a VR video processing method and a related apparatus, to resolve a problem in other approaches that user experience is reduced because a user may miss highlight content in a VR video for the user can randomly view a part of an image of the VR panoramic video only in a manner of autonomously switching an angle of view.

In an existing VR panoramic video solution, a VR system returns video content based on information of an angle of view provided by a terminal device. The following describes a specific procedure of the existing VR panoramic video solution.

Figure 1:
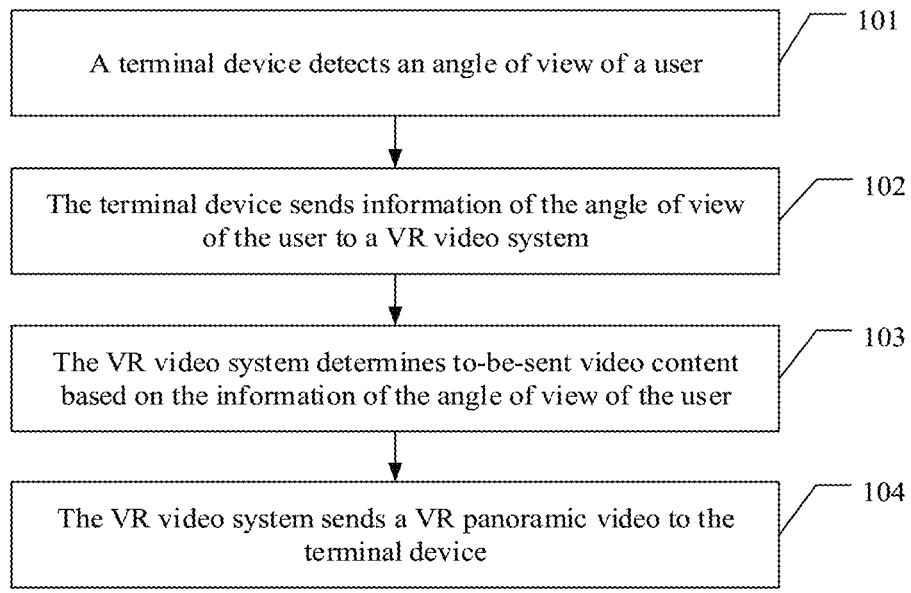
FIG. 1 is a flowchart of an existing VR panoramic video solution.

As shown in FIG. 1, first, a terminal device keeps tracking an angle of view of a user, and sends detected information of the angle of view of the user to a VR video system. The VR video system determines, based on the received information of the angle of view of the user, panoramic video content to be returned to the terminal device. The VR video system sends a VR panoramic video to the terminal device.

It can be learned from the foregoing that the existing VR panoramic video is played based on switching of the angle of view of the user, and the angle of view of the user is randomly switched when the user does not understand all content of the panoramic video. In this case, it is very likely that the user misses highlight content in the panoramic video during random image switching. The existing VR panoramic video solution does not provide guidance for the user to view the video. As a result, the user lacks a sense of interaction in a video viewing process. In addition, it is very likely that the user misses the highlight content in the video, causing poor user experience in video viewing.

Therefore, the embodiments of the present disclosure provide a VR video processing method and a related apparatus, which can effectively guide the user to move the angle of field. In this way, the user pays attention to the highlight content in the panoramic video in time, thereby further improving user experience. The following provides detailed descriptions with reference to the accompanying drawings.

Figure 2:
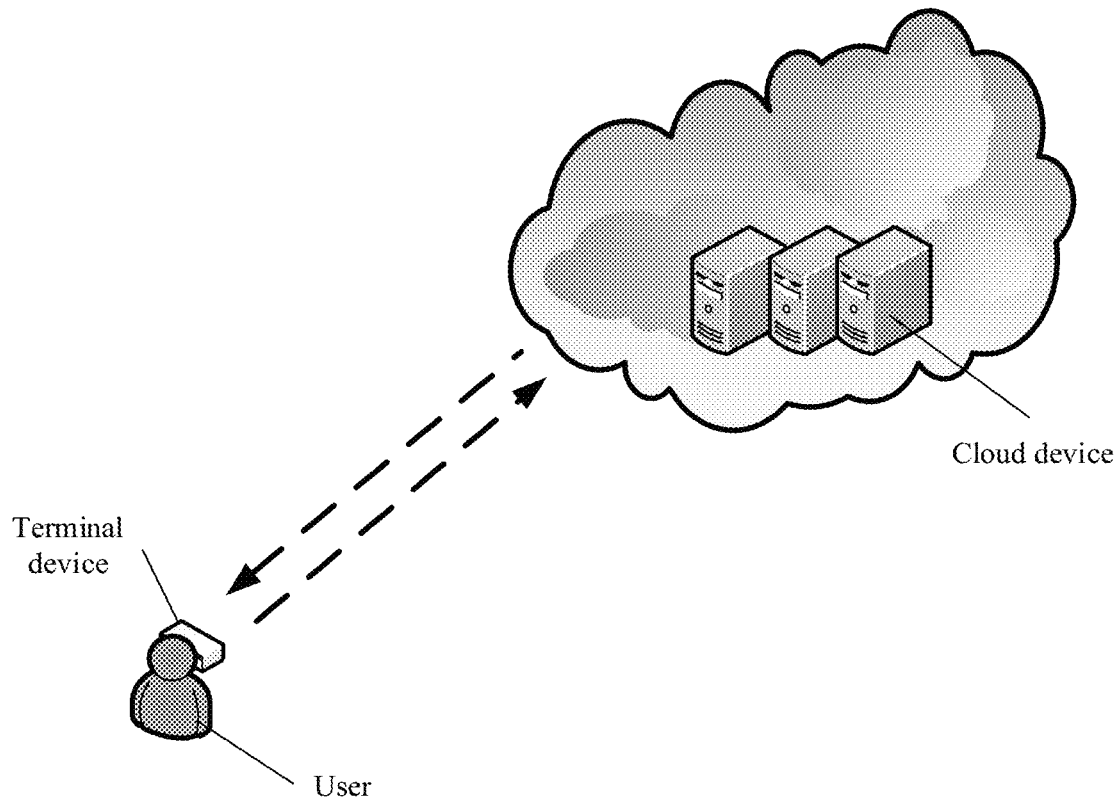
FIG. 2 is a schematic architectural diagram of a system according to an embodiment of the present disclosure.

FIG. 2 is a schematic architectural diagram of a system according to an embodiment of the present disclosure. The system includes a cloud device and a terminal device. It should be noted that this embodiment of the present disclosure is described using an example in which the cloud device is used as a video processing device, that is, using an example in which a cloud VR device implements a function of a video processing device. This is also applicable to a case in which a local high-performance host is used to implement a function of a video processing device.

The cloud device is a remote server deployed on the cloud, and has a relatively good image processing function and data computing function. For example, the cloud device may perform a rendering operation, a logical operation function, and the like. The cloud device may be a super multi-core server, a computer on which a graphics processing unit (GPU) cluster is deployed, a large distributed computer, a cluster computer with hardware resource pooling, or the like. In this embodiment of the present disclosure, the cloud device may track a change of an angle of view of a user of the terminal device, establish and update in real time a region popularity table of a video image to collect information of hotspot regions in which most users are interested, and notify the user of the hotspot viewing regions of a panoramic video, thereby guiding the user to view the panoramic video.

The cloud device may further store application data of the terminal device, for example, data such as an environment image in an application. Storing the application data of the terminal device in the cloud device can alleviate data storage pressure on the terminal device, and can also ensure security of the application data in the terminal device, thereby preventing the application data from being easily stolen.

The terminal device may track the change of the angle of view of the user, and transmit information of the angle of view of the user to the cloud device, or may display an image in a VR application to the user using a display. The terminal device may locally store data of the VR application, or may not locally store data of the VR application but store the data of the VR application in the cloud device instead. When the VR application needs to be run, the data of the VR application is loaded using the cloud device.

The terminal device includes a device worn on a head of the user, for example, VR glasses or a VR helmet, and may further include a device worn on another part of the user, for example, a device worn on a hand, an elbow, a foot, or a knee of the user, such as a game handle. In this embodiment of the present disclosure, the terminal device has a capability of displaying a VR panoramic video. For example, the terminal device needs to perform reprojection based on an angle of view image that is obtained from the cloud device to obtain a video image that can be displayed, and present the VR panoramic video to the user. Particularly, the VR panoramic video presented to the user includes a prompt of hotspot viewing regions.

Figure 3:
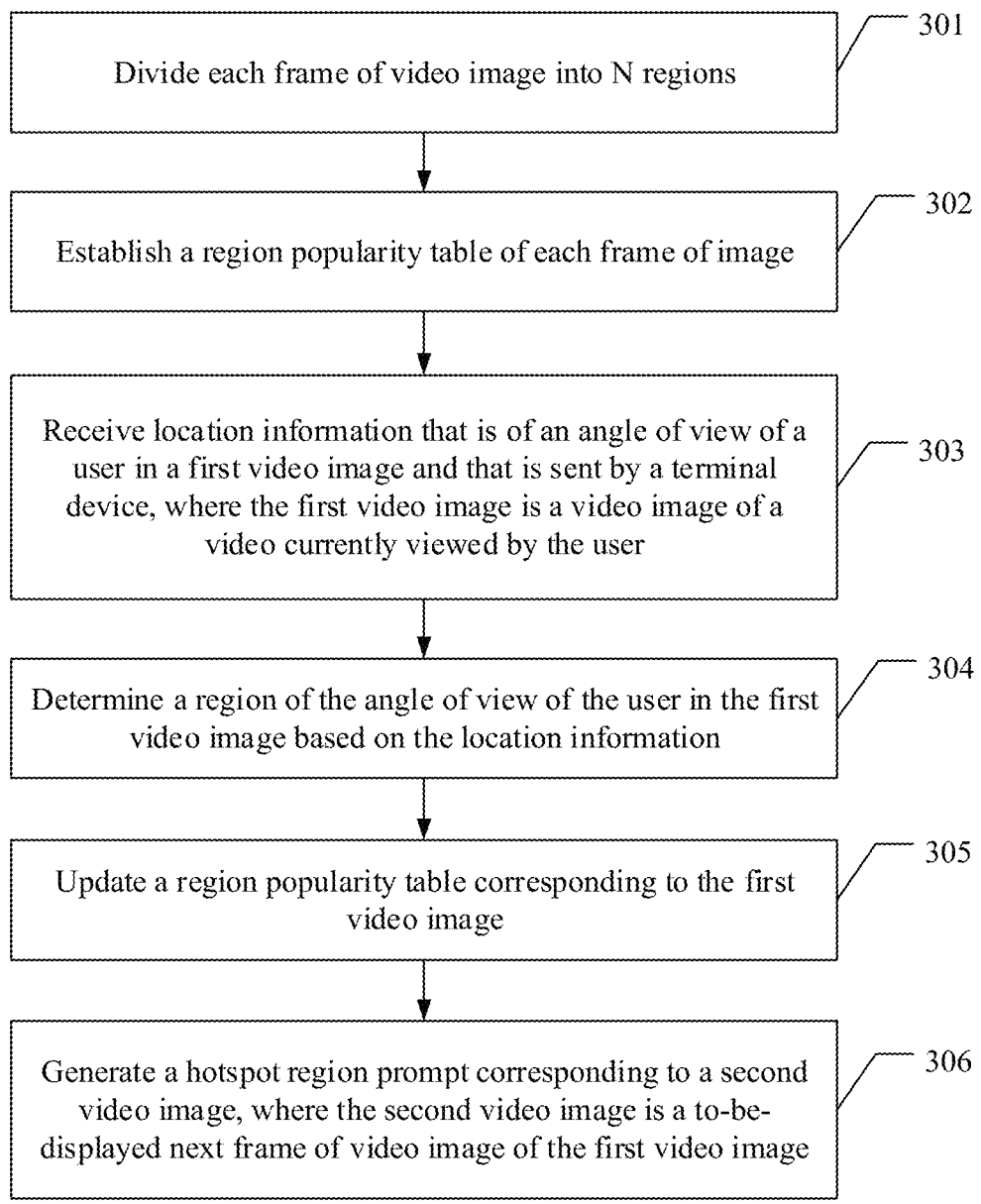
FIG. 3 is a schematic diagram of a VR video processing method according to an embodiment of the present disclosure.

FIG. 3 is a schematic diagram of a VR video processing method according to an embodiment of the present disclosure. The VR video processing method provided in this embodiment of the present disclosure may be applied in the application scenario provided in the foregoing FIG. 2. The method includes the following steps.

Step 301. A cloud device divides each frame of video image of a received video into N regions. Herein, N is a positive integer.

Figure 4:
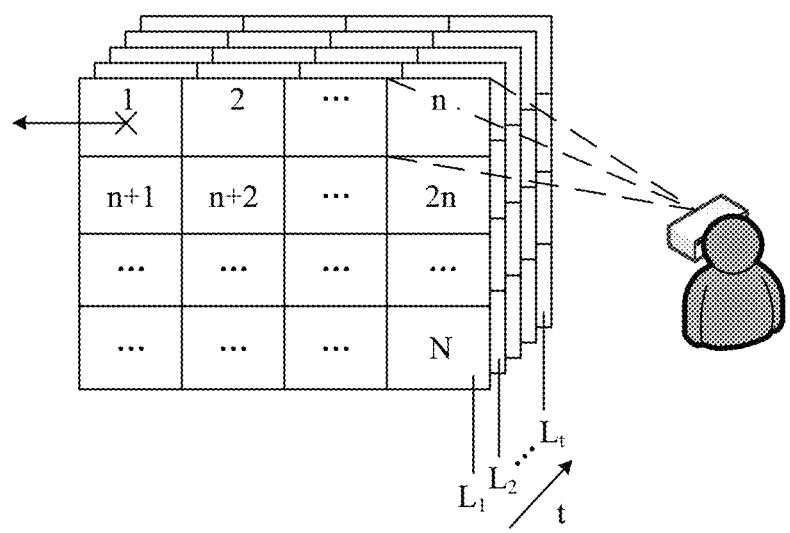
FIG. 4 is a schematic diagram of video image division according to an embodiment of the present disclosure.

The cloud device receives a VR panoramic video. The video may be uploaded by a device manager to the cloud device, or may be uploaded by a user to the cloud device, or may be uploaded by a supplier of the VR panoramic video. The cloud device divides each frame of video image of the video into N regions. Optionally, a size of the region obtained through division is consistent with a size of a field of view (FOV) of the terminal device. During division, a size of a specific region at a boundary of the video image may be inconsistent with the size of the FOV, which does not affect implementation of the technical solution. For ease of understanding the video image division method, the following provides description by using a figure. FIG. 4 is a schematic diagram of video image division. The VR video image has t frames, which are respectively frames $L_1, L_2, \ldots,$ and $L_t$. Each frame of video image is divided into N regions based on the FOV of the terminal device. Location information of each region may be indicated by using spherical longitude and latitude coordinates of a central point of the region. For example, location information of a region 1 is spherical longitude and latitude coordinates $(x_1, y_1)$ of a central point of the region 1.

Step 302. The cloud device establishes a region popularity table of each frame of image. The region popularity table includes location information of the N regions and corresponding popularity values of the N regions.

The cloud device establishes a region popularity table for each frame of video image, for example, tables $M_1$, $M_2, \ldots,$ and $M_t$ corresponding to video images $L_1$, $L_2, \ldots,$ and $L_t$. In the region popularity table, popularity information of each region of each frame of video image is recorded. Specifically, the region popularity table may include location information of each region and a corresponding popularity value of each frame. For example, in the table $M_t$, a sequence number n of an $n^{th}$ region of a $t^{th}$ frame of video image $L_t$ and a popularity value $P_n$ of the region are recorded. Spherical longitude and latitude coordinates $(x_n, y_n)$ of a central point of the $n^{th}$ region may be found based on the sequence number n. Viewing popularity of this region may be determined based on the popularity value. In addition, the region popularity table further includes frame time information.

Step 303. The cloud device receives location information that is of an angle of view of a user in a first video image and that is sent by the terminal device. The first video image is a video image of a video currently viewed by the user.

When the user views a panoramic video in the cloud device on demand, the cloud device tracks the angle of view of the user, and continuously updates and maintains the region popularity table of each frame of video image in the video.

The terminal device may detect the change of the angle of view of the user, and report the location information of the angle of view of the user to the cloud device at any time. The cloud device receives the location information that is of the angle of view of the user and that is reported by the terminal device, and obtains a location of the angle of view in the video image currently viewed by the user.

Step 304. Determine a region of the angle of view of the user in the first video image based on the location information. The region is one of N regions obtained by dividing the first video image.

The cloud device obtains, based on the received location information and with reference to a region division status, the region of the angle of view of the user in the currently viewed video image. It should be noted that tracking the angle of view of the user may be performed continuously to obtain the information of the angle of view of the user in real time. In addition, a location of the angle of view of the user in the video image may not exactly coincide with a region. In this case, the region in which the angle of view of the user is located may be determined by comparing a distance between a central point of the angle of view of the user and a central point of the region.

Figure 5:
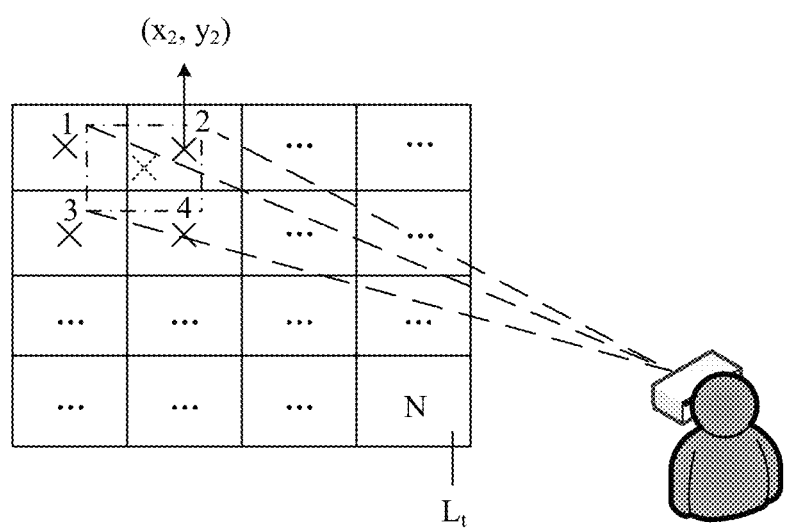
FIG. 5 is a schematic diagram of tracking an angle of view of a user according to an embodiment of the present disclosure.

FIG. 5 is a schematic diagram of tracking an angle of view of a user. In the figure, the user currently views the $t^{th}$ frame of the video image $L_t$, and the angle of view falls within a region 1, a region 2, a region 3, and a region 4. Because the central point of the angle of view is closer to a central point of the region 2, the cloud device obtains information indicating that the angle of view of the user is located in the region 2, when the user views the frame $L_t$ of video. Certainly, there are a plurality of methods for determining the region in which the angle of view of the user is located. This is not limited in this embodiment of the present disclosure.

Step 305. Update a region popularity table of the first video image based on the region of the angle of view of the user. After obtaining the region that is in the currently viewed video image and in which the angle of view of the user is located, the cloud device updates the region popularity table of the video image, and increase a popularity value of the corresponding region in the region popularity table by 1. For example, corresponding to the foregoing case in FIG. 5, a popularity value $P_2$ of a region 2 in a region popularity table $M_t$ of the $t^{th}$ frame of the currently viewed video $L_t$ may be added by 1. It should be noted that the region popularity table can reflect a hotspot region in a panoramic video viewed by the user, and video popularity data is collected in the table. The popularity data may be collected and stored in real time. The information of the angle of view when each user views each frame of video image may be stored in the corresponding region popularity table in a form of a popularity value.

Step 306. Generate, based on the popularity information of the region popularity table of the first video image or popularity information of a region popularity table of a second video image, a hotspot region prompt corresponding to the second video image. The second video image is a next frame of to-be-displayed video image of the first video image.

Optionally, the cloud device generates the hotspot region prompt based on the region popularity table of the to-be-displayed next frame of video image, to remind the user not to miss a possible highlight region in the panoramic video.

The cloud device may prompt the user by using collected historical hotspot region information, for example, record hotspot region information of each frame of video image viewed by many users viewing the panoramic video, and provide, based on the historical hotspot region information, a prompt for the user currently viewing the panoramic video. The cloud device first determines a hotspot region of the to-be-displayed next frame of video image. A method of the determining may be querying a region popularity table of the next frame of video image based on a frame time, and screening out M regions with highest popularity values. The M regions are hotspot regions viewed by users. Herein, M may be 1, that is, the cloud device determines only one region with a highest popularity value, or M may be another integer greater than 1 and less than N, that is, the cloud device determines regions with highest popularity values. Herein, a value of M may be preconfigured, or may be set by the user before viewing a video.

Optionally, the cloud device generates the hotspot region prompt based on the region popularity table of the video image currently viewed by the user or region popularity tables of several frames of video images recently viewed by the user, that is, prompts the user by using the collected real-time hotspot region information. For example, when viewing a VR panoramic video of a live program such as a football match, the cloud device may collect and store in real time a region of the angle of view at which each user views each frame of video image, generate a region popularity table of each frame of video image in real time, and record video hotspot region information. Based on the region popularity table of the video image currently viewed by the user or the region popularity table of the several frames of video images recently viewed by the user, the hotspot region of the to-be-displayed next frame of video image may be predicted, so that the prompt is provided for the user.

Specifically, the cloud device first determines the hotspot region of the to-be-displayed next frame of video image. A method of the determining may be querying a region popularity table of a currently viewed video image or region popularity tables of several frames of video images based on a frame time, and screening out M regions with highest popularity values. The M regions are hotspot regions viewed by users. For selection of a value of M, refer to the foregoing. Details are not described herein again. The M hotspot regions are matched to the to-be-displayed next frame of video image, to obtain the corresponding hotspot regions.

The cloud device adds hotspot region prompts corresponding to the M hotspot regions to the video image currently viewed by the user. After determining the M hotspot regions, the cloud device obtains location information of the M hotspot regions, and compares locations of the hotspot regions in a video with a location of a video image currently viewed by the user. A comparison result may be that the hotspot regions are above, below, on the left or right of the current angle of view of the user, or the like. The cloud device provides the prompt for the user based on such information of a relative location.

Figure 6:
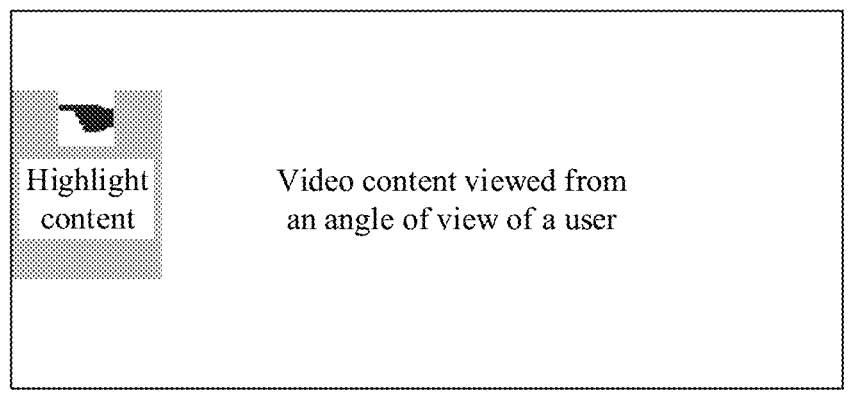
FIG. 6 is a schematic diagram of a hotspot region prompt according to an embodiment of the present disclosure.

The cloud device generates corresponding prompt information texture, and renders the prompt information texture to an image currently viewed by the user. FIG. 6 is a schematic diagram of a possible hotspot region prompt. When the location of the hotspot region in the video is on the left of the current angle of view of the user, an arrow towards left is formed, or a text prompt may be formed. For example, the text prompt may be "highlight content", "turn to the left for highlight content", "more highlight content on the left", or "your friends are viewing content on the left".

It should be understood that the hotspot region prompt information may be added in real time. The prompt information may be added in real time to a currently viewed panoramic video based on the collected real-time hotspot region information or the historical hotspot region information. Alternatively, the hotspot region prompt information may be added through preconfiguration. The prompt information is added to a panoramic video in advance based on the collected historical hotspot region information or predetermining of hotspot region information.

It should be noted that in this embodiment of the present disclosure, a plurality of region popularity tables may be established for each frame of video image to track and collect hotspot viewing regions of users in a plurality of types of viewing videos. For example, region popularity tables $L_{tA}$, $L_{tB}$, $L_{tC}$, and the like of a $t^{th}$ frame of video may be established. Herein, A, B, and C are identification information of user types. For example, A is identification information of a user that often views an animal-type video, B is identification information of a user that often views a scenery-type video, and C is identification information of a user that often views a martial arts action movie video. When the information of the angle of view of the user is tracked, a type of video often viewed by a user needs to be first identified, to determine identification information of a user type. When the region popularity table is updated, the corresponding region popularity table is updated based on the identification information. Therefore, based on the region popularity table, hotspot viewing regions in each frame of video for users in different video viewing types may be obtained. The hotspot region prompt may be provided for the user, or the prompts may be provided for different types of users.

In this embodiment of the present disclosure, the location of the angle of view of the user in the video image is tracked, and the region popularity table of the video image is maintained and updated, to collect the hotspot region information of each frame of video image. In addition, the hotspot region prompt is provided for the user based on the hotspot region information. In this way, this helps guide the user to move the angle of view and the user will not miss highlight content in the panoramic video. Therefore, user experience of the panoramic video is improved.

Figure 7:
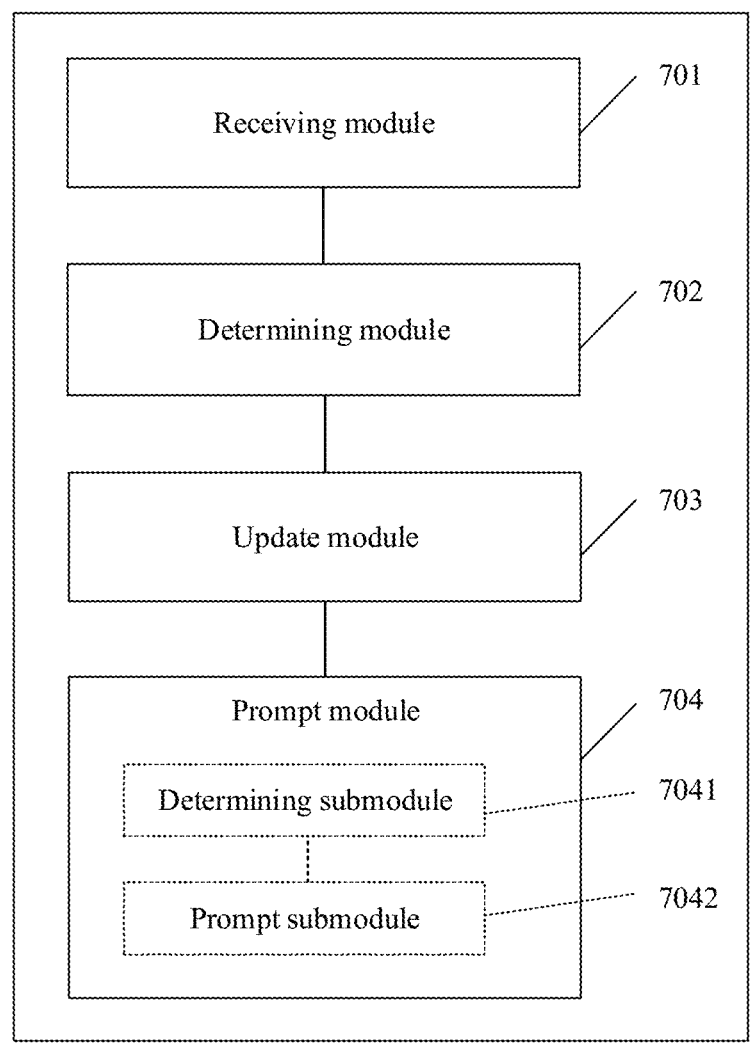
FIG. 7 is a schematic diagram of composition of a video processing device according to an embodiment of the present disclosure.

FIG. 7 is a schematic diagram of composition of a video processing device according to an embodiment of the present disclosure. The device may include a receiving module 701, a determining module 702, an update module 703, and a prompt module 704.

The receiving module 701 is configured to receive location information that is of an angle of view of a user in a first video image and that is sent by a terminal device. The first video image is a video image of a video currently viewed by the user. For a specific process, refer to step 303 in the embodiment shown in FIG. 3.

The determining module 702 is configured to determine a region of the angle of view of the user in the first video image based on the received location information. The region is one of N regions obtained by dividing the first video image, and N is a positive integer. For a specific process, refer to step 304 in the embodiment shown in FIG. 3. Specifically, a region division method may be that a size of the region obtained through division is the same as a size of a field of view of the terminal device. For a specific process, refer to step 301 in the embodiment shown in FIG. 3.

The update module 703 is configured to update a region popularity table of the first video image based on the region. The region popularity table includes popularity information of the N regions. For a specific process, refer to step 304 in the embodiment shown in FIG. 3. Specifically, the popularity information includes location information and a popularity value. For specific content, refer to step 302 in the embodiment shown in FIG. 3.

Specifically, a method for updating the region popularity table may be that the update module 703 is configured to increase a popularity value of the region of the first video image by 1. The region is a region of the angle of view of the user. For a specific process, refer to step 305 in the embodiment shown in FIG. 3.

The prompt module 704 is configured to generate, based on the popularity information of the region popularity table of the first video image or popularity information of a region popularity table of a second video image, a hotspot region prompt corresponding to the second video image. The second video image is a next frame of to-be-displayed video image of the first video image. Specifically, the prompt submodule 704 may further include a determining submodule 7041 and a prompt submodule 7042. A specific method may be as follows.

The determining submodule 7041 is configured to determine a hotspot region of the second video image. The determining is performed based on the following the hotspot region is a region with a highest popularity value in the region popularity table of the first video image, or the hotspot region is a region with a highest popularity value in the region popularity table of the second video image. A method of the determining may be screening out M regions with highest popularity values. The M regions are hotspot regions viewed by users. Herein, M may be 1, that is, the video processing device determines only one region with a highest popularity value, or M may be another integer greater than 1 and less than N, that is, the video processing device determines several regions with highest popularity values. A value of M may be preconfigured, or may be set by the user before viewing a video.

The prompt submodule 7042 is configured to add a hotspot region prompt corresponding to the hotspot region to the first video image. Hotspot region prompt information may be added in real time. The prompt information may be added in real time to a currently viewed panoramic video based on collected real-time hotspot region information or historical hotspot region information. Alternatively, hotspot region prompt information may be added through preconfiguration. The prompt information is added to a panoramic video in advance based on collected historical hotspot region information or predetermining of hotspot region information. For a specific process, refer to step 305 in the embodiment shown in FIG. 3.

The video processing device provided in this embodiment of this application may be configured to perform the VR video processing method. For technical effects that can be obtained by using the video processing device, refer to the foregoing method embodiment. Details are not described herein again.

Figure 8:
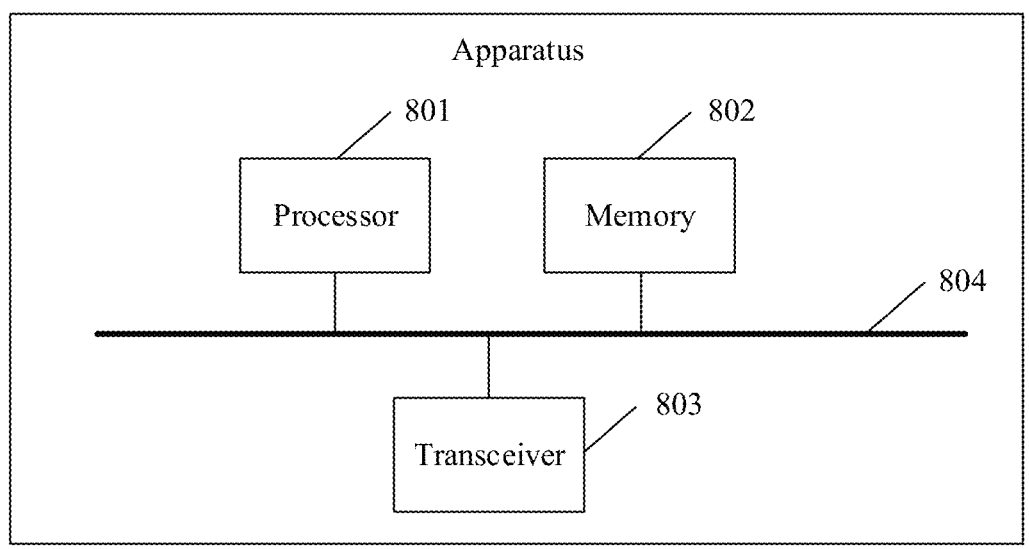
FIG. 8 is another schematic diagram of composition of a video processing device according to an embodiment of the present disclosure.

FIG. 8 is another schematic diagram of composition of a video processing device according to an embodiment of the present disclosure. The video processing device includes at least one processor 801 and a transceiver 802, and optionally, may further include a memory 803.

The memory 803 may be a volatile memory such as a random access memory. Alternatively, the memory may be a non-volatile memory such as a read-only memory, a flash memory, a hard disk drive (HDD), or a solid-state drive (SSD). Alternatively, the memory 803 is any other medium that can be used to carry or store expected program code in an instruction form or a data structure form and that can be accessed by a computer. However, this is not limited thereto. The memory 803 may be a combination of the foregoing memories.

In this embodiment of the present disclosure, a specific connection medium between the processor 801 and the memory 803 is not limited. In this embodiment of the present disclosure, the memory 803 and the processor 801 are connected by using a bus 804 in the figure. The bus 804 is represented by using a bold line in the figure. A connection manner between other parts is merely an example for description, and does not impose a limitation. The bus 806 may be classified into an address bus, a data bus, a control bus, and the like. For ease of representation, only one thick line is used to represent the bus in FIG. 8, but this does not mean that there is only one bus or only one type of bus. The processor 801 may have a data receiving/transmitting function. The processor 801 can communicate with another device. For example, in this embodiment of the present disclosure, the processor 801 may send a video to a terminal device, or may receive information of an angle of view of a user from the terminal device. For example, an independent data transceiver module may be disposed in the video processing device in FIG. 8. For example, the transceiver 802 is configured to receive/transmit data. When the processor 801 communicates with another device, data may be transmitted by using the transceiver 802. For example, in this embodiment of the present disclosure, the processor 801 may send a video to the terminal device by using the transceiver 802, or receive the information of the angle of view of the user from the terminal device by using the transceiver 802.

In an implementation, a function of the transceiver 802 may be implemented by using a transceiver circuit or a dedicated transceiver chip. It may be considered that the processor 801 is implemented by using a dedicated processing chip, a processing circuit, a processor, or a universal chip. For example, the processor 801 may be a central processing unit (CPU), or the processor may be another general purpose processor, a digital signal processor (DSP), an application-specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

In another implementation, it may be considered that the video processing device provided in this embodiment of the present disclosure is implemented by using a general purpose computer. To be specific, program code for implementing functions of the processor 801 and the transceiver 802 are stored in the memory 803, and the general purpose processor implements the functions of the processor 801 and the transceiver 802 by executing the code in the memory 803.

When the video processing device adopts the form shown in FIG. 8, the processor 801 in FIG. 8 may invoke a computer executable instruction stored in the memory 802, so that the video processing device can execute the method executed by the video processing device in the foregoing method embodiment. For specific steps, refer to the descriptions in the foregoing method or another embodiment. Details are not described herein again.

It may be clearly understood by a person skilled in the art that, for the purpose of convenient and brief description, for a detailed working process of the foregoing apparatus and module, reference may be made to a corresponding process in the foregoing method embodiments. Details are not described herein again.

Various numerical symbols in the embodiments of the present disclosure are merely used for differentiation for ease of description, but are not used to limit the scope of the embodiments of the present disclosure. The sequence numbers of the foregoing processes do not mean execution sequences. The execution sequences of the processes should be determined according to functions and internal logic of the processes, and should not be construed as any limitation on the implementation processes of the embodiments of the present disclosure.

A person of ordinary skill in the art may be aware that, in combination with illustrative logical blocks described in the embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

In the several embodiments provided in the present disclosure, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, an SSD), or the like.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of present disclosure shall be subject to the protection scope of the claims.

What is claimed is:

1. A virtual reality (VR) video processing method implemented by a video processing device, wherein the VR video processing method comprises:
   receiving, from a terminal device, location information that is of an angle of view of a user viewing a first image, wherein the first image is a currently displayed image of a video;
   determining a first region of the angle of view based on the location information, wherein the first region is one region of a plurality of regions of the first image;
   updating a first popularity table based on the first region, wherein the first popularity table comprises popularity information of the plurality of regions of the first image; and
   generating a hotspot region prompt corresponding to a second image based on the first popularity table and a second popularity table,
   wherein the second popularity table comprises popularity information of a plurality of regions of the second image, and
   wherein the second image is a to-be-displayed image of the video.

2. The VR video processing method of claim 1, wherein a first size of the first region and a second size of a field of view of the terminal device are a same size.

3. The VR video processing method of claim 1, wherein the first popularity information comprises a popularity value of each region of the plurality of regions of the first image.

4. The VR video processing method of claim 3, further comprising updating the first popularity table by increasing the popularity value of the first region of the first popularity table by 1.

5. The VR video processing method of claim 3, further comprising:
   determining a hotspot region of the second image, wherein the hotspot region corresponds to the hotspot region prompt, and wherein the hotspot region comprises a highest popularity value in the first popularity table; and
   adding the hotspot region prompt to the second image.

6. The VR video processing method of claim 3, further comprising:
   determining a hotspot region of the second image, wherein the hotspot region corresponds to the hotspot region prompt and includes a highest popularity value in the second popularity table; and
   adding the hotspot region prompt to the second image.

7. A video processing device, comprising:
   a processor; and
   a memory coupled to the processor and configured to store instructions that, when executed by the processor, cause the video processing device to be configured to:

receive, from a terminal device, location information that is of an angle of view of a user viewing a first image, wherein the first image is a currently displayed image of a video;

determine a first region of the angle of view based on the location information, wherein the first region is one region of a plurality of regions of the first image;

update a first popularity table based on the first region, wherein the first popularity table comprises popularity information of the plurality of regions of the first image; and generate a hotspot region prompt corresponding to a second image based on the first popularity table and a second popularity table, wherein the second popularity table comprises popularity information of a plurality of regions of the second image, and wherein the second image is a to-be-displayed image of the video.

8. The video processing device of claim 7, wherein a first size of the first region and a second size of a field of view of the terminal device are a same size.

9. The video processing device of claim 7, wherein the first popularity information comprises a popularity value of each region of the plurality of regions of the first image.

10. The video processing device of claim 9, wherein the instructions further cause the video processing device to be configured to update the first region popularity table by increasing the popularity value of the first region of the first popularity table by 1.

11. The video processing device of claim 9, wherein the instructions further cause the video processing device to be configured to:

determine a hotspot region of the second image, wherein the hotspot region corresponds to the hotspot region prompt; and add the hotspot region prompt to the second image.

12. The video processing device of claim 11, wherein the hotspot region comprises a first highest popularity value in the first popularity table.

13. The video processing device of claim 11, wherein the hotspot region comprises a second highest popularity value in the second popularity table.

14. A computer program product comprising instructions that are stored on a non-transitory computer-readable storage medium and that, when executed by a processor, cause an apparatus to:

receive, from a terminal device, location information that is of an angle of view of a user viewing a first image, wherein the first image is a currently displayed image of a video;

determine a first region of the angle of view based on the location information, wherein the first region is one region of a plurality of regions of the first image;

update a first popularity table based on the first region, wherein the first popularity table comprises popularity information of the plurality of regions of the first image; and generate a hotspot region prompt corresponding to a second image based on the first popularity table and a second popularity table, wherein the second popularity table comprises popularity information of a plurality of regions of the second image, and wherein the second image is a to-be-displayed image of the video.

15. The computer program product of claim 14, wherein a first size of the first region and a second size of a field of view of the terminal device are a same size.

16. The computer program product of claim 14, wherein the first popularity information comprises a popularity value of each region of the plurality of regions of the first image.

17. The computer program product of claim 14, wherein the instructions further cause the apparatus to update the first popularity table by increasing the popularity value of the first region of the first popularity table by 1.

18. The computer program product of claim 17, wherein the instructions further cause the apparatus to:

determine a hotspot region of the second image, wherein the hotspot region corresponds to the hotspot region prompt; and add the hotspot region prompt to the second image.

19. The computer program product of claim 18, wherein the hotspot region comprises a first highest popularity value in the first popularity table.

20. The computer program product of claim 18, wherein the hotspot region comprises a second highest popularity value in the second popularity table.

* * * * *

UNITED STATES PATENT AND TRADEMARK OFFICE
CERTIFICATE OF CORRECTION

PATENT NO. : 11,341,712 B2  
APPLICATION NO. : 17/245905  
DATED : May 24, 2022  
INVENTOR(S) : Hongbo Liu et al.

Page 1 of 1

It is certified that error appears in the above-identified patent and that said Letters Patent is hereby corrected as shown below:

On the Title Page

U.S. Patent Documents: "11,070,891 B1 07/2021 Ettinger" should read "11,070,891 B1 07/2021 Effinger"

Signed and Sealed this  
Nineteenth Day of July, 2022

Katherine Kelly Vidal  
*Director of the United States Patent and Trademark Office*